United States Patent
Naeyaert

(10) Patent No.: US 9,038,532 B2
(45) Date of Patent: May 26, 2015

(54) MOVABLE FRICTION BLOCKS FOR A RECTANGULAR BALER

(71) Applicant: CNH America LLC, New Holland, PA (US)

(72) Inventor: Karel O.R. Naeyaert, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 124 days.

(21) Appl. No.: 13/852,813

(22) Filed: Mar. 28, 2013

(65) Prior Publication Data
US 2013/0255512 A1   Oct. 3, 2013

(30) Foreign Application Priority Data

Mar. 30, 2012   (BE) .................................. 2012/0219

(51) Int. Cl.
*A01F 15/08* (2006.01)
*A01F 15/04* (2006.01)

(52) U.S. Cl.
CPC ........... *A01F 15/0825* (2013.01); *A01F 15/046* (2013.01)

(58) Field of Classification Search
CPC .................. A01F 15/0825; A01F 2015/048
USPC ............ 100/179, 187, 189, 188 R, 191, 192; 56/341
See application file for complete search history.

(56) References Cited

U.S. PATENT DOCUMENTS

| | | | |
|---|---|---|---|
| 3,424,081 A * | 1/1969 | Hoke | 100/192 |
| 4,119,025 A | 10/1978 | Brown | |
| 4,244,167 A * | 1/1981 | Seefeld et al. | 56/341 |
| 4,354,430 A | 10/1982 | Horiuchi | |
| 4,750,418 A * | 6/1988 | Naaktgeboren | 100/50 |
| 4,791,865 A * | 12/1988 | Naaktgeboren | 100/218 |

FOREIGN PATENT DOCUMENTS

| | | | |
|---|---|---|---|
| EP | 0745320 A1 | 12/1996 | |
| EP | 0908089 A1 | 4/1999 | |

* cited by examiner

*Primary Examiner* — Jimmy T Nguyen
(74) *Attorney, Agent, or Firm* — Seyed V. Sharifi T.; Patrick M. Sheldrake

(57) ABSTRACT

Rectangular baler comprising a bale chamber adapted to contain one or more bales; a compacting plunger for advancing crop material in a direction towards a discharge opening of the bale chamber; wherein the rectangular baler further comprises at least one friction block mounted moveably in a wall of the bale chamber such that at least a part of each friction block is moveable out of the wall; and biasing element adapted for biasing the at least one friction block in a position wherein the at least one friction block protrudes out of the wall.

14 Claims, 8 Drawing Sheets

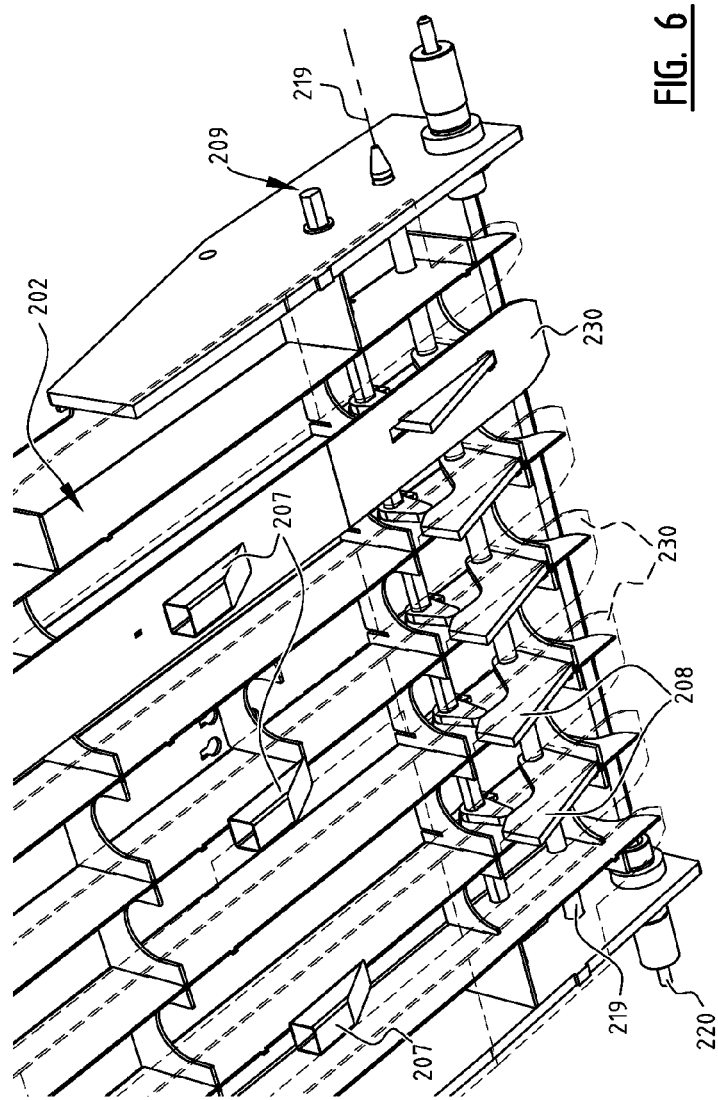

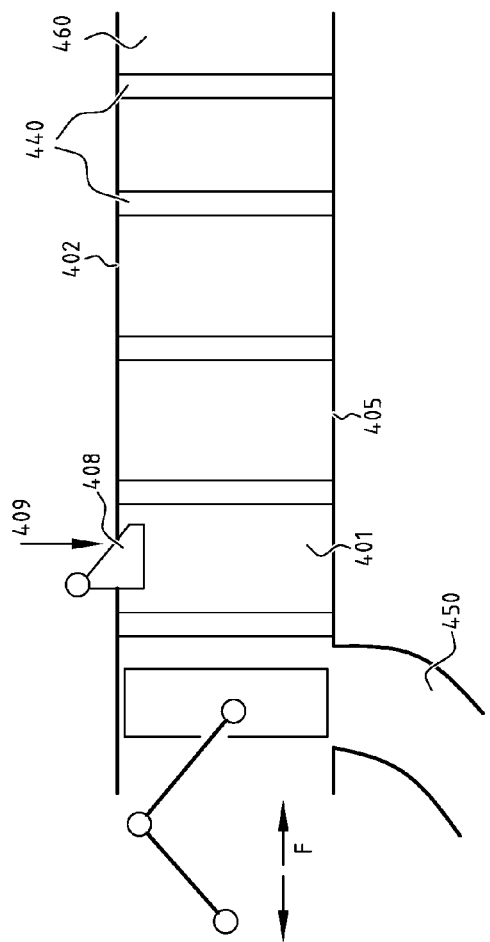

MOVABLE FRICTION BLOCKS FOR A RECTANGULAR BALER

CROSS REFERENCE TO RELATED APPLICATIONS

This Patent Application claims priority under 35 U.S.C. §119 to Belgian Application BE 2012/0219, filed on Mar. 30, 2012 titled, "Moveable Friction Blocks for a Rectangular Baler" and having Karel O. R. Naeyaert as the inventor. The full disclosure of BE 2012/0219 is hereby fully incorporated herein by reference.

TECHNICAL FIELD

The present invention relates to a baler, in particular a rectangular baler.

BACKGROUND ART

In rectangular balers bales are formed by compressing crop material in a bale chamber by a plunger that reciprocates in the bale chamber.

An example of a bale chamber of the prior art is shown in FIG. 1. The bale chamber 1 comprises a top wall 2, a bottom wall 5, and two side walls 6. At one end of the bale chamber there is provided a plunger 3. The top wall 2 and/or the bottom wall 5 and/or the side walls 6 may be provided with a series of hay dogs 4. When the plunger moves in a discharge direction F to add a flake of crop to the bale, the hay dogs 4 hold the flake in shape. The top wall 2 and the side walls 6 are typically hinged at the end near the plunger 3, allowing to adjust the position thereof, and to exert a compacting force on the top wall and the side walls. In that way the density of the bales may be regulated.

The problem with the balers of the prior art is that in certain circumstances it is not possible to produce bales with an acceptable density, even when using the maximum pressure on the walls of the bale chamber.

SUMMARY

Accordingly, the present invention, in any of the embodiments described herein, may provide one or more of the following advantages:

The object of an embodiment of the invention is to provide a baler which addresses the above mentioned problem, and in particular to provide a baler with an increased energy efficiency for producing large square bales with an acceptable density.

An object of another embodiment of the invention is to provide an alternative for the conventional hay dogs.

According to an aspect of the invention there is provided a rectangular baler comprising a bale chamber adapted to contain one or more bales; a compacting plunger for advancing crop material in a discharge direction towards a discharge opening of the bale chamber; at least one friction block mounted moveably in a wall of the bale chamber; and biasing means adapted for biasing said at least one friction block in a position wherein the at least one friction block protrudes at least partly out of the wall. The biasing means allow to exert a pressure on the at least one friction block whilst protruding out of the wall and to set a position for obtaining a good energy efficiency and acceptable density.

The use of such a friction block can increase the density of the bales, improve the stability of the system, whilst also improving the energy sufficiency of the system. This will allow to produce bales with an acceptable density, also in difficult circumstances. Also without adjustable bale chamber walls (doors), using an adjustable friction block according to the invention, good results may be obtained. More in particular, embodiments of the invention allow to omit the conventional density belt used to exert a pressure on the moveable doors, and to use fixed chamber walls.

According to a preferred embodiment a friction block is mounted pivotably around a pivot axis, and the biasing means are adapted to exert a pressure on said friction block whilst protruding out of the wall. The biasing means typically comprise an actuator, e.g. a jack.

According to a preferred embodiment a friction block comprises an inclined surface extending from the wall in the discharge direction when said friction block protrudes out of the wall. The biasing means are preferably adapted to bias the angle of the inclined surface.

According to an advantageous embodiment, there may be provided a control system adapted for steering the biasing means. According to a preferred embodiment the rectangular baler comprises a plurality of friction blocks mounted moveably in a wall of the bale chamber such that at least a part of each friction block is moveable out of the wall. The biasing means are then adapted for biasing said plurality of friction blocks. The plurality of friction blocks may be mounted pivotably around a common pivot shaft, and the biasing means may be adapted to bias said plurality of friction blocks around said common pivot shaft. According to an alternative embodiment, each friction block is individually moveable around an individual pivot axis and/or can be individually biased by separate biasing means. Yet other embodiments may have a plurality of pivot shafts, each shaft carrying one or more friction blocks.

An advantageous embodiment of the biasing means comprises a biasing shaft and at least one pawl element fixed on said shaft. Each pawl element is coupled with a friction block of the at least one friction block, such that a rotation of the biasing shaft adjusts the biasing of the at least one friction block. In that way a simple and robust construction is provided for mounting and biasing a plurality of friction blocks. Note that the pawl elements may have different dimensions and/or may be located at different angular positions, such that when the shaft is rotated, the pawl elements may bias the friction blocks differently.

According to a possible embodiment the plurality of friction blocks is arranged in a row spaced at a distance from each other, wherein each friction block of said row is arranged in the wall at substantially the same distance from the plunger. Further, there may be provided a series of rows, wherein the dimensions of the friction blocks may be different for the different rows.

According to a possible embodiment the or each friction block is mounted in a top wall of the bale chamber. The Applicant has observed that the use of such a friction block can greatly improve the energy efficiency in terms of energy needed for obtaining an acceptable density, especially when arranging the friction block in the top wall of the bale chamber. However, the skilled person will understand that it is also possible to use friction blocks in the side walls and/or in the bottom wall. More in particular the friction blocks of the invention may replace the conventional hay dogs and may take away the need for adjustable top and/or side doors.

According to a possible embodiment the top wall is moveable, and the baler comprises an actuator to exert a pressure on the top wall. Such a moveable top wall, also called top door, is typically pivotable around a horizontal pivot axis extending between two sides of the bale chamber at the plunger end of the bale chamber. Preferably, also the side walls are pivotable around a vertical pivot axis arranged at the plunger end of the bale chamber. The top wall and/or the side walls may comprise a first wall part adjoining the plunger and a second wall part adjoining the discharge opening, wherein said second wall part is inclined with respect to the first wall part. The friction blocks are then preferably arranged in the first wall part. In operation, the first wall part will typically extend under a small angle with respect to a horizontal plane, while the second wall part will typically extend substantially in a horizontal plane. In that way, in the first part of the bale chamber, the density of the bales is further increased until the bales reach the second part, especially when a number of friction blocks is provided in said first part.

According to a preferred embodiment a wall of the bale chamber comprises a plurality of slats extending in the discharge direction, wherein for each friction block there is provided a recess in a slat of the plurality of slats, and said friction block is moveable out of said recess. Note that it is also possible to provide a friction block in an already available recess between two adjacent slats.

According to a preferred embodiment the or each friction block, seen in a plane of the wall, perpendicular to the discharge direction, has a maximum width which is larger than 1 cm. The width is preferably at least 10 times smaller than a width of the bale chamber seen in a direction perpendicular to the discharge direction. Further the inclined surface, seen in the discharge direction, has preferably a maximum length which is larger than 5 cm, more preferably larger than 8 cm. Also, the or each friction block, when in a position protruding from the wall, seen in a direction perpendicular to the wall, has preferably a maximum height which is larger than 2 cm, preferably larger than 3 cm.

According to a preferred embodiment, the distance between a friction block and the plunger, when the latter is in an extended position, is more than 10 cm. This distance and the number of friction blocks is preferably optimized for obtaining a good energy efficiency. Note that the position and the distance may be dependent on the type of crop material, and other circumstances influencing the compacting properties of the crop material.

BRIEF DESCRIPTION OF THE FIGURES

The accompanying drawings are used to illustrate presently preferred non-limiting exemplary embodiments of the present invention. The above and other advantages, features and objects of the invention will become more apparent and the invention will be better understood from the following detailed description when read in conjunction with the accompanying drawings in which:

FIG. 6 is a perspective schematic view of an alternative embodiment of a bale chamber according to the invention, looking from the inside of the bale chamber to the top wall and the plunger; FIG. 8 is a schematic view of another embodiment of a bale chamber of the invention.

FIG. 1 illustrates a part of an embodiment of a bale chamber according to the prior art. Note that only the parts relevant for understanding the present invention are illustrated. Other parts of the baler which are well known to the skilled person, such as the curved pre-compression chamber, the needle assembly and the knotter devices have been omitted. The bale chamber 1 has an inlet (not shown, below the plunger 3) and a discharge opening. The view of FIG. 1 is a view when looking from the discharge opening towards the plunger 3. The bale chamber is delimited by a bottom wall 5, two side walls 6 and a top wall 2. The compacting plunger 3 advances bales in a discharge direction F between a retracted position and an extended position. When the plunger 3 moves in the discharge direction F to add a flake of crop to the bale, the hay dogs 4 hold the flake in shape. The plunger 3 may be provided with recesses allowing said plunger to extend over the hay dogs 4. The top wall 2 and optionally also the side walls 6 are typically moveable like doors hinged at the plunger end of the bale chamber. Each side wall 6 is hinged around a vertical pivot axis 16, and the top wall is hinged around a horizontal pivot axis 12. During operation, pressure is exerted on the top wall 2 and optionally also on the side wall 6.

FIGS. 2 and 3 illustrate a part of a bale chamber 201 according to an embodiment of the invention, looking at the plunger end of the top wall, from below the top wall and from above the top wall, respectively. FIGS. 2 and 3 show a part of a top wall 202 of the bale chamber 201 and a part of the plunger 203. The top wall 202 comprises a series of slats 230 extending in the discharge direction F of the bale chamber. The slats 230 are spaced at a distance from each other, seen in the width direction of the bale chamber. A number of friction blocks 208 is arranged in the top wall 202 of the bale chamber 201. Optionally, there may be provided conventional hay dogs (not shown) at the plunger end of the top wall 202. However, it is also possible to use a row of friction blocks 208 of the invention instead of the conventional hay dogs.

Figure 1:
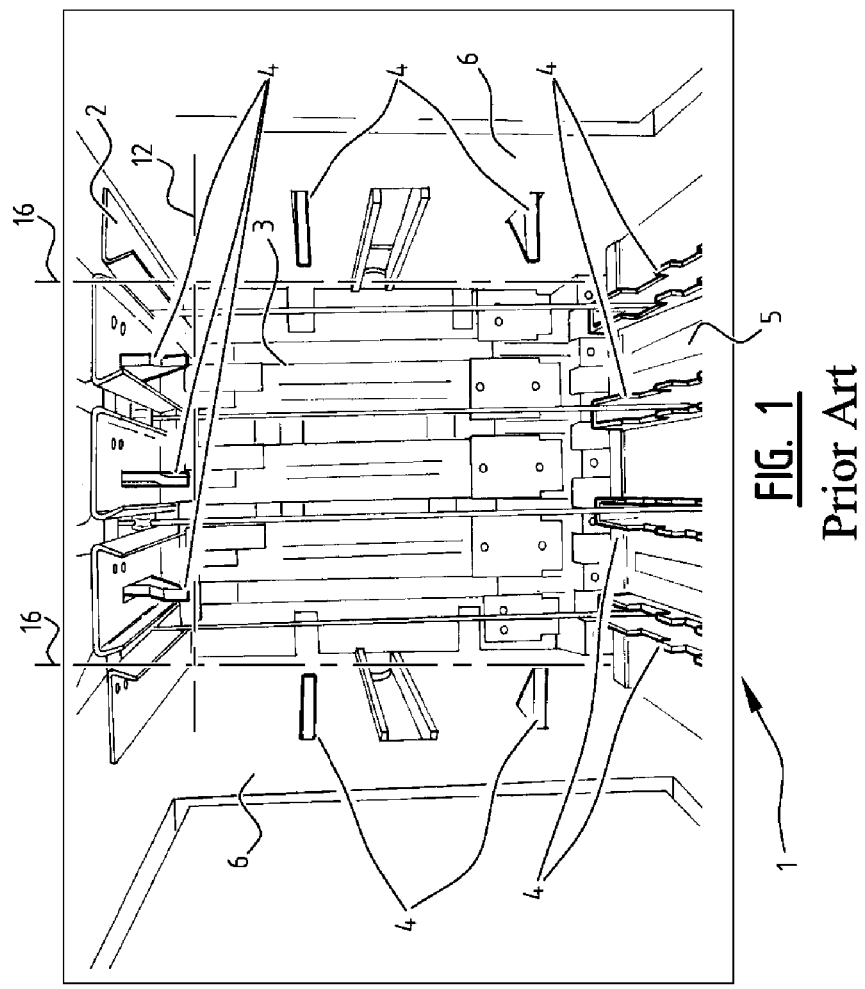
FIG. 1 is a schematic perspective view of an embodiment of a bale chamber according to the prior art, seen from the discharge end of the bale chamber.

A friction block 208 is mounted moveably in the wall 202 such that at least a part thereof can protrude out of the wall 202. Biasing means 209 bias said friction block 208 in a desired position. Depending on the type of crop material and the baling circumstances, the operator may adjust the biasing means in order to make the friction blocks protrude more or less out of the top wall during baling.

In the illustrated embodiment each friction block 208 is freely rotatable around a pivot axis 219. More in particular, the plurality of friction blocks 208 are arranged in a row and are mounted pivotably around a common pivot shaft 221, but the skilled person understands that it is also possible to provide separate shafts for each friction block, such that the friction blocks may be individually biased. Further, other solutions for moveable mounting the friction blocks, using e.g. spring means, also fall within the scope of the invention.

The biasing means comprise a biasing shaft 222 and a plurality of pawl elements 223 fixed on said shaft 222. Each pawl element 223 is coupled with a friction block 208, such that a rotation of the biasing shaft 222 adjusts the biasing of the plurality of friction blocks 208. In the illustrated embodiment all pawl elements 223 are identical and fixed in the same angular position. However, it is possible to shift a pawl element some degrees in relation to another pawl element, such that when the shaft is turned, the pawl elements will push with a different force on the respective friction blocks. Also, it is possible to provide bias shafts for each friction block. Further, a control system can be installed to steer the biasing means.

Figure 5:
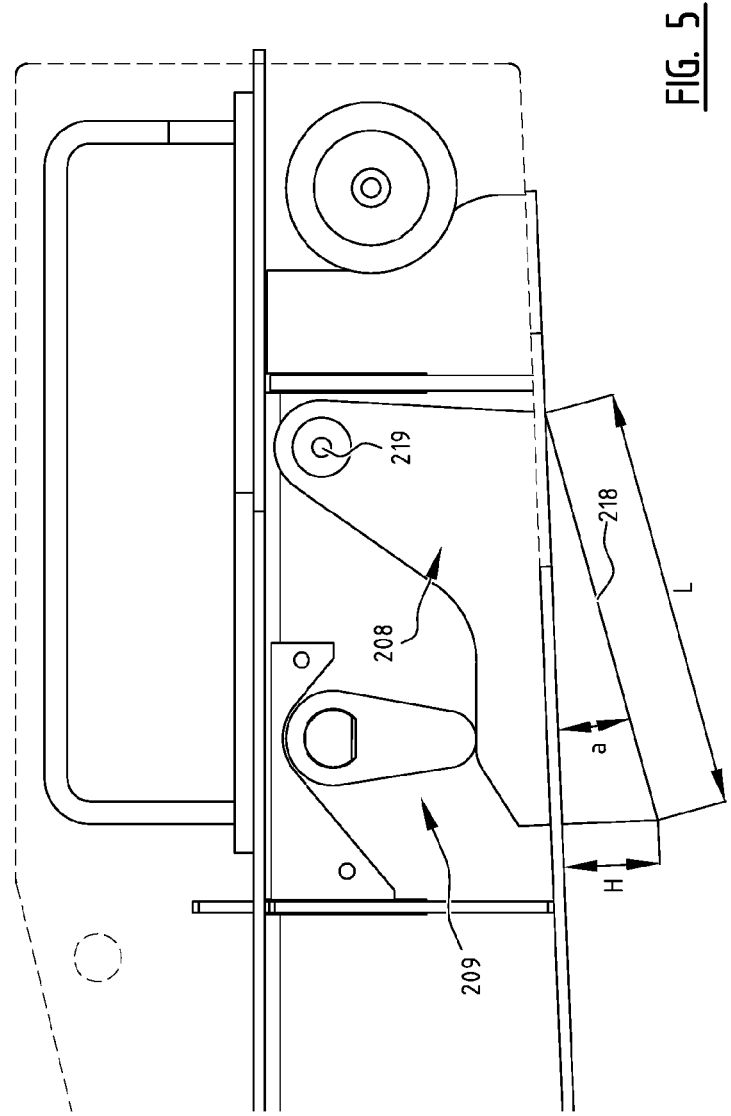
FIG. 5 is a detailed view of the top wall of FIG. 4 at the plunger end.

Each friction block 208 comprises an inclined surface 218 extending from the surface of the wall 202 in the discharge direction F when said friction block protrudes out of the wall. The biasing means 209 are adapted to bias the angle a of the inclined surface 218 with respect to the surface of the top wall, see FIG. 5. The inclined surface 218, seen in the discharge direction F, has preferably a maximum length L which is larger than 5 cm, more preferably larger than 8 cm. A friction block 208, when in a position protruding from the wall 202, has preferably a maximum height H which is larger than 2 cm, preferably larger than 3 cm. The width W of the or each friction block is at least 10 times smaller than the width of the bale chamber seen in a direction perpendicular to the discharge direction F, and is e.g. between 0.5 and 10 cm.

Figure 7A:
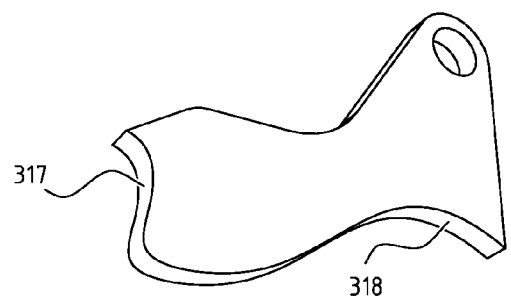
FIGS. 7A-7C are perspective schematic views of other embodiments of a friction block for use in a baler of the invention.
Figure 7B:
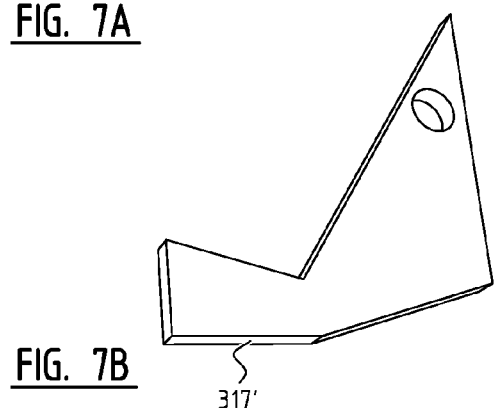
Figure 7C:
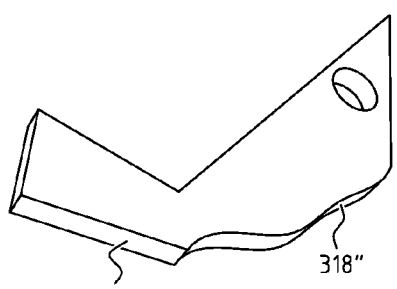

Although the inclined surface 218 is shown to be a flat surface, the skilled person will understand that the degree of inclination does not need to be constant, and that the inclined surface may be curved, see inclined surfaces 318 and 318" of FIGS. 7A and 7C, respectively. Further, the friction block 208 comprises a second surface 217 extending forward from the first inclined surface 218 towards the wall. Also this second surface may be shaped in different ways, see e.g. second surfaces 317, 317' and 317" shown in FIGS. 7A-7C, respectively.

The top wall of the bale chamber 202 comprises a plurality of slats 230 extending in the discharge direction F. For each friction block 208, there is provided a recess 231 in a slat 230, and the friction block 208 is moveable out of said recess 231. In the illustrated embodiment, the slats 230 are provided with recesses 231 from which the friction blocks 280 protrude. However, the skilled person understands that the friction blocks may also enter the bale chamber in between two adjacent slats, rather than having a specially designed recess for it. This would be more economical, and could e.g. be done when the rope is far enough from the location of the friction blocks. According to an exemplary embodiment, the friction blocks may be located as close as possible to a side of one of the two adjacent slats.

In the illustrated embodiment one row with five friction blocks 208 is shown. The skilled person will understand that it may also be possible to provide more than one row with more or less than five friction blocks. Further, the dimensions of the friction blocks of different rows may be different.

Figure 4:
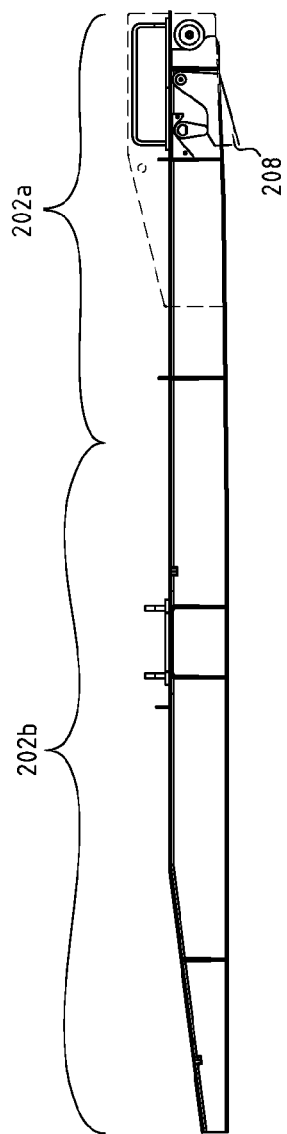
FIG. 4 is a side view of the top wall of the embodiment of FIG. 2.

As shown in FIG. 4, the top wall 202 comprises a first part 202a which is inclined with respect to a second part 202b of the top wall 202. The number of friction blocks 208 is preferably arranged in the first part 202a. In operation, this first part 202a will typically make a small angle with a horizontal plane to further compact the bales as they move forward in the bale chamber 201.

It is noted that the moveable friction blocks disclosed in the present application may be combined with fixed friction blocks as disclosed in the Belgian patent application of the Applicant filed on the same day as the present application. Such an embodiment is shown in FIG. 6. At a distance of the row of moveable friction blocks 208 there is provided a row of fixed friction blocks 207. The moveable friction blocks 208 could also be located at the location of the fixed friction blocks 207 and vice versa. Also, there could be provided two or more rows of moveable friction blocks 208, optionally in combination with fixed friction blocks 207.

Figure 2:
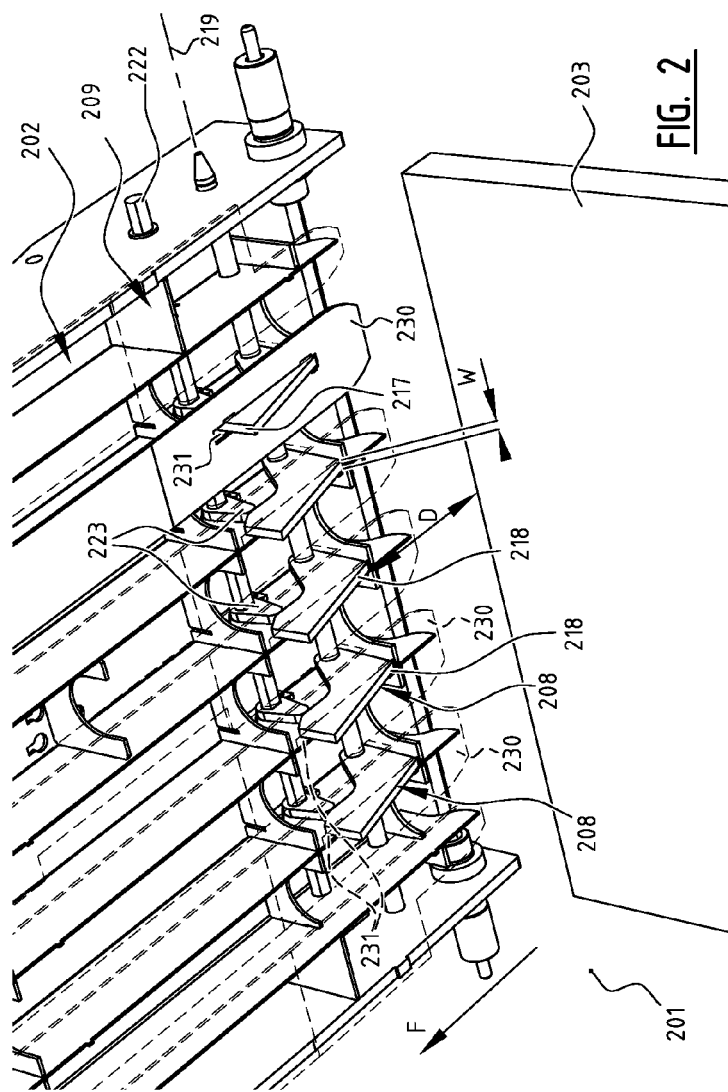
FIG. 2 is a perspective schematic view of an embodiment of a bale chamber according to the invention, looking from the inside of the bale chamber to the top wall and the plunger.
Figure 3:
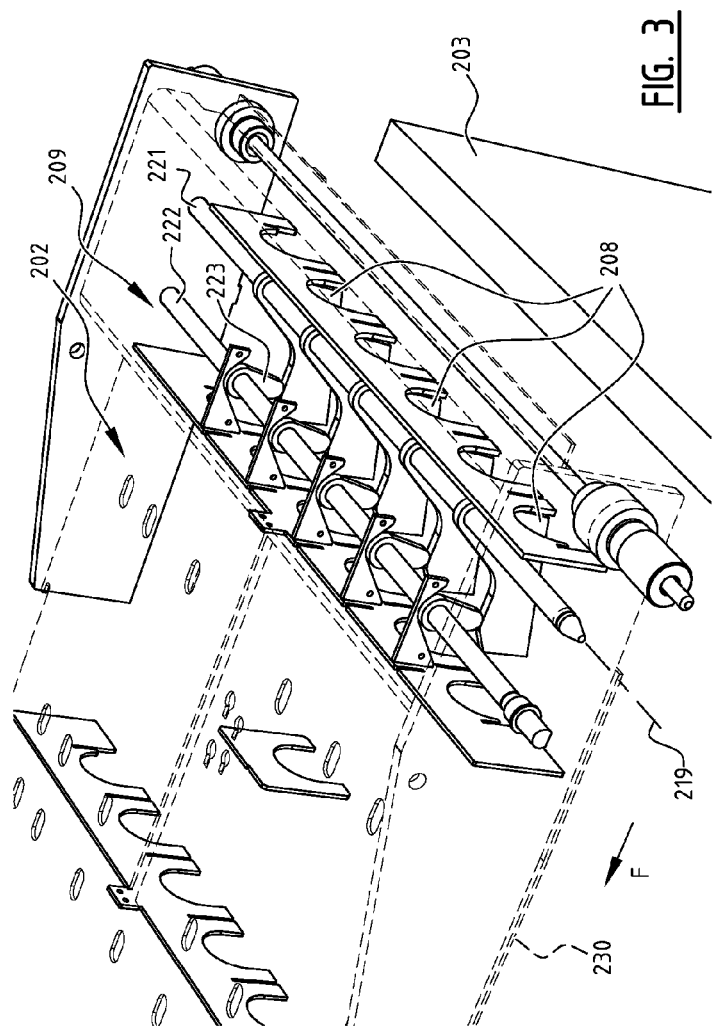
FIG. 3 is a perspective schematic view of an embodiment of a bale chamber according to the invention, looking from outside of the bale chamber to the top wall.

FIG. 8 illustrates schematically a further embodiment of a bale chamber of the invention. The bale chamber 401 has an inlet 450 and a discharge outlet 460. The bale chamber 401 comprises a bottom wall 405 and a top wall 402. Contrary to the embodiment of FIG. 2, the top wall 402 is meant to be fixed in operation. Further there may be provided a series of straps or bands 440 around the bale chamber 401 to maintain the walls in place and/or to avoid bending of the walls of the bale chamber 401 in operation. A number of friction blocks 408 are arranged in the top wall 402. As explained in connection with previous embodiments there may be provided one or more rows of moveable and/or fixed friction blocks. The friction blocks 408 are biased through biasing means 409 which are schematically shown. The biasing means 409 can be any suitable biasing means including a biasing shaft with pawl elements as disclosed in connection with other embodiments, a suitable spring means, etc.

While the principles of the invention have been set out above in connection with specific embodiments, it is to be understood that this description is merely made by way of example and not as a limitation of the scope of protection, which is determined by the appended claims.

The invention claimed is:

1. A rectangular baler comprising:
   a bale chamber adapted to contain one or more bales;
   a compacting plunger for advancing crop material in a discharge direction towards a discharge opening of the bale chamber;
   at least one friction block mounted moveably in a wall of the bale chamber such that at least a part of the at least one friction block is moveable out of the wall; and
   at least one biasing element configured to bias said at least one friction block in a position wherein the at least one friction block protrudes out of the wall; the at least one biasing element further including a biasing shaft and at least one pawl element fixed on said biasing shaft, the at least one pawl element being coupled with said at least one friction block, such that a rotation of the biasing shaft adjusts the biasing of the at least one friction block.

2. The rectangular baler of claim 1, wherein the at least one friction block is mounted pivotably around a pivot axis, and the at least one biasing element is adapted to exert a pressure on said friction block whilst protruding out of the wall.

3. The rectangular baler of claim 1, wherein the at least one friction block comprises an inclined surface extending from the wall in the direction when said friction block protrudes out of the wall.

4. The rectangular baler of claim 3, wherein the at least one biasing element is adapted to bias the angle of the inclined surface.

5. The rectangular baler of claim 1, wherein said at least one friction block comprises a plurality of friction blocks mounted pivotably around a common pivot shaft, and the at least one biasing element is adapted to pivot said plurality of friction blocks around said common pivot shaft.

6. The rectangular baler of claim 1, wherein said at least one friction block comprises a plurality of friction blocks arranged in a row spaced at a distance from each other, wherein each friction block of said row is arranged in the wall at the same distance from the plunger.

7. The rectangular baler of claim 1, wherein the at least one friction block is mounted in a top wall of the bale chamber.

8. The rectangular baler of claim 1, wherein at least one of a bottom wall and a top wall of the bale chamber are provided with a plurality of hay dogs in an area near the plunger, and the at least one friction block is arranged, seen in the discharge direction, at a distance of the plurality of hay dogs.

9. The rectangular baler of claim 1, wherein the wall comprises a first wall part adjoining the plunger and a second wall part adjoining the discharge opening, wherein said second wall part is inclined with respect to the first wall part, and the at least one friction block is arranged in said first wall part.

10. The rectangular baler of claim 1, wherein the wall of the bale chamber comprises a plurality of slats extending in the direction and spaced at a distance from each other, wherein there is provided a recess in a slat of the plurality of slats, and a friction block is moveable out of said recess.

11. The rectangular baler of claim 1 wherein the at least one friction block is arranged in the wall at a distance from the plunger, when in an extended position, which is more than 10 cm.

12. The rectangular baler of claim 1, wherein the at least one friction block seen in a plane of the wall, perpendicular to the discharge direction, has a maximum width which is larger than 1 cm, wherein the maximum width is preferably at least 10 times smaller than a width of the bale chamber seen in a direction perpendicular to the discharge direction.

13. The rectangular baler of claim 3, wherein said inclined surface, seen in the discharge direction, has a maximum length which is larger than 5 cm.

14. The rectangular baler of claim 1 wherein the at least one friction block, when in a position protruding from the wall, seen in a direction perpendicular to the wall, has a maximum height which is larger than 2 cm.

* * * * *